(12) United States Patent
Jeffrey et al.

(10) Patent No.: US 6,262,720 B1
(45) Date of Patent: Jul. 17, 2001

(54) ELECTRONIC CHECKLIST SYSTEM WITH CHECKLIST INHIBITING

(75) Inventors: Gary S. Jeffrey, Marysville; Daniel J. Boorman, Woodinville; Martin C. Hartel, Renton, all of WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/122,309

(22) Filed: Jul. 24, 1998

(51) Int. Cl.[7] ....................................................... G06F 17/21
(52) U.S. Cl. .......................... 345/326; 345/339; 707/500
(58) Field of Search ................................... 345/326, 333, 345/334, 338, 339, 345, 348, 347, 352; 707/500, 526, 513

(56) References Cited

U.S. PATENT DOCUMENTS

| | | |
|---|---|---|
| 2,718,628 | 9/1955 | Bartlett et al. . |
| 3,713,090 | 1/1973 | Dickinson . |
| 4,970,683 | 11/1990 | Harshaw et al. . |
| 5,016,147 | 5/1991 | Voorhees . |
| 5,019,961 * | 5/1991 | Addesso et al. ..................... 700/87 |
| 5,270,931 * | 12/1993 | Appleford ............................ 701/3 |
| 5,444,837 | 8/1995 | Bomans et al. . |
| 5,454,074 * | 9/1995 | Hartel et al. ...................... 345/326 |
| 5,475,594 | 12/1995 | Oder et al. . |
| 5,522,026 | 5/1996 | Records et al. . |
| 6,057,786 * | 5/2000 | Briffe et al. ...................... 340/975 |

FOREIGN PATENT DOCUMENTS 2694104  1/1994  (FR) .

OTHER PUBLICATIONS

The 777 Electronic Checklist System—Boeing Airliner, Apr.–Jun. 1997.

* cited by examiner

Primary Examiner—Raymond J. Bayerl
Assistant Examiner—Cao H. Nguyen
(74) Attorney, Agent, or Firm—Christensen O'Connor Johnson Kindness PLLC

(57) ABSTRACT

An electronic checklist system (ECL) for a complex system and corresponding method for controlling the presentation of non-normal checklists based on signals generated by a crew alert system according to non-normal operating conditions of the complex system. The ECL system automatically inhibits all non-relevant non-normal checklists, thereby removing the burden from the crew of having to determine what checklists are redundant or inappropriate based on the occurring non-normal conditions. An inhibited non-relevant non-normal checklists does not include a checklist status icon displayed adjacent to its associated crew alert message. This indicates to the crew that the associated non-normal checklist is not required to be accomplished. In addition, the inhibited checklist is removed from the checklist queue, its operational notes are removed from the notes file, its deferred line items are removed from the predefined normal checklist, and the checklist state is preserved. A software interface tool allows for remote modification of the checklists.

22 Claims, 13 Drawing Sheets

ELECTRONIC CHECKLIST SYSTEM WITH CHECKLIST INHIBITING

FIELD OF THE INVENTION

This invention relates to methods and apparatus for providing checklist procedures useful in the safe and efficient operation of relatively complex apparatus and equipment. More specifically, this invention relates to methods and apparatus for efficiently displaying and executing checklist procedures in the operation of airplanes and other complex equipment and systems that employ a plurality of checklists applicable to normal and non-normal operating conditions.

BACKGROUND OF THE INVENTION

As will be better understood from the following description, the present invention was developed for decreasing crew workload when interacting with an electronic checklist (ECL) system during the presence of non-normal aircraft conditions. While developed for use in this environment and described in connection with this environment, it is anticipated that the invention will also find use in other environments employing a plurality of checklists applicable to normal and non-normal operating conditions.

There are many environments in which checklists are used in an attempt to ensure safe and reliable operation of various types of equipment and systems. In some environments, such as the operation of airplanes and other complex equipment and systems, several "normal" checklists are used during different operational phases encountered when the airplane or other equipment is operating under normal conditions. Usually, these environments also employ several "non-normal" (also known as "abnormal", "irregular" or "emergency") checklists that are used when various non-normal operating conditions are encountered.

One type of checklist often used today on airplanes is a printed paper checklist, which lists checklist line items (checklist steps) on a series of cards or the pages of a book. Although simple in form, paper checklists are subject to several disadvantages and drawbacks. For example, if checklist items are skipped for later performance they may be forgotten. In addition, paper checklists do not provide an indication of checklist execution progress, i.e., they do not provide an indication of whether line items have been completed or not completed. Thus, the completion of checklist line items may be forgotten if the execution of a checklist is interrupted for any reason.

There have been various attempts to provide improved checklist systems, including devices for scrolling a paper checklist so that one checklist line item at a time is visible through a window or other opening. Electromechanical checklist systems also have been provided. Electromechanical checklists generally include a plurality of switches that correspond to various line items. In such systems, the switches are actuated to indicate completion of the corresponding line item. Checklist systems that audibly read out line items of a selected checklist also have been developed. In such systems, the pilot or other crew member typically activate a check-off switch to proceed to the next checklist item. Electronic checklist systems also have been provided, with such systems usually displaying checklist items on a cathode ray tube such as an airplane weather radar display. The checklist provided by these prior art electronic systems generally correspond to paper checklists that simply have been converted to electronic format.

An improvement over the foregoing and other previous developed systems is described in U.S. Pat. No. 5,454,074 (Hartel et al.). Hartel et al. describes a computer-based electronic checklist (ECL) system for the rapid and accurate presentation of both normal and non-normal checklists upon request by a flight crew. The normal checklists are arranged in a sequence that corresponds to the order in which the normal checklists are used during normal operation of an airplane. The non-normal checklists include checklists applicable to and associated with crew alert messages that are supplied by an airplane crew alert system in response to an associated non-normal aircraft condition. Also provided are non-normal checklists that are applicable to situations for which the airplane crew alert system does not provide a crew alert message.

FIG. 1 illustrates a typical scenario showing the steps required of a pilot using the ECL system of Hartel et al. In order for a pilot to get the desired result from the illustrated example, the pilot must maneuver through ten steps. A ten step scenario is of acceptable length provided the pilot has adequately retained training procedures of how to navigate from a non-normal checklist associated with a primary non-normal condition to non-normal checklists associated with secondary non-normal conditions and then back. In this regard, the checklist associated with the primary non-normal condition is the highest checklist in a hierarchical structure of checklists related to a group of non-normal conditions. If a primary system fails, causing the failure of secondary systems, non-normal checklists relating to all the failures are retrieved. That is, the non-normal checklist that relates to the primary system failure and the non-normal checklists that relate to the secondary system failures are all retrieved. The completion of the retrieved non-normal checklist relating to the primary system failure makes the execution of the non-normal checklists relating to secondary system failures unnecessary, because either the primary system failure was the cause of the secondary system failures or the steps performed by the non-normal checklists associated with the secondary system failures are included in the non-normal checklist relating to the primary system failure.

The exemplary scenario illustrated in FIG. 1 relates to a hydraulic system failure. When the hydraulic system of an airplane fails (a primary failure), the flight controls and stabilizer systems of the airplane become degraded (secondary failures). These failures cause crew alert messages 10, 12 and 14 and checklist status icons 18, 20 and 22 to be displayed on the display 16 of an Engine Indicating Crew Alerting System (EICAS). These displays inform the pilot what non-normal checklists are to be executed in response to the system failure. In this example, the display includes a crew alert message related to the primary failure denoted HYD PRESS SYS R+C and two alert messages related to the two secondary failures denoted FLIGHT CONTROLS and STABILIZER, respectively. While crew alert messages related to both primary and secondary failures are displayed, in reality, only the checklist related to the primary failure, i.e., the checklist related to the HYD PRESS SYS R+C crew alert message is required to be executed in response to the primary failure. A pilot seeing the crew alert messages on the EICAS display 16, will actuate a CHKL button located on a Display Select Panel (not shown) that will cause a checklist queue 28 to be displayed. This is step 1. The pilot will then select the non-normal checklist associated with the primary failure. Selection can be accomplished by highlighting or placing a cursor on the appropriate part of the display and actuating a cursor control key. This is step 2. The pilot's action causes a non-normal checklist 10b associated with the primary failure to be displayed. Next, the pilot completes the checklist. The last step of the checklist associated with the primary failure, i.e., the HYD PRESS SYS R+C non-normal checklist display 10b, is an Open Loop Action Item 30. The Open Loop Action Item 30 identifies the checklists that need to be overridden. This has the potential of creating pilot confusion.

In order to override the non-normal checklists listed in the Open Loop Action Item 30, the pilot must first select a NON-NORMAL button 32 included in the HYD PRESS SYS R+C non-normal checklist display 10b. Again, selection is accomplished by highlighting or placing a cursor on the appropriate part of the display and actuating a cursor control key. This causes the checklist queue 28 to be redisplayed. Next, the pilot selects the non-normal checklist associated with the first listed secondary failure denoted FLIGHT CONTROLS from the checklist queue 28. Selection is performed as described above. This is step 4. The pilot's action causes a non-normal checklist 12b associated with the secondary failure denoted FLIGHT CONTROLS to be displayed. Next, the pilot overrides the FLIGHT CONTROLS checklist by selecting a CHKL OVRD button 34. This is step 5.

In order to override the last non-normal checklist listed in the Open Loop Action Item 30 shown in the HYD PRESS SYS R+C non-normal checklist display 10b, the pilot must first select a NON-NORMAL button 32 included with the FLIGHT CONTROLS non-normal checklist display 12b. This is step 6. This causes the checklist queue 28a to be redisplayed with the overridden checklist not present. Next, the pilot selects the non-normal checklist associated with the other secondary failure denoted STABILIZER from the checklist queue 28a. Selection is performed as described above. This is step 7. The pilot's action causes a non-normal checklist 14b associated with the secondary failure denoted STABILIZER to be displayed. Next, the pilot overrides the STABILIZER checklist by selecting the CHKL OVRD button 34. This is step 8.

The pilot returns to the checklist queue 28 by selecting a NON-NORMAL button 32 included with the STABILIZER non-normal checklist display 14b. This is step 9. This causes the HYD PRESS SYS R+C non-normal checklist display 10c to be redisplayed with the Open Loop Action Item 30 checklist. This is step 10. At this point, all of the pilot tasks associated with this ECL system example are completed.

As will be readily apparent from the foregoing description, clearing each non-normal checklist associated with a secondary non-normal condition requires that the following four steps be performed: 1. selection of NON-NORMAL button; 2. selection of checklist from checklist queue; 3. select CHKL OVRD button; 4. selection of NON-NORMAL button.

Even though Hartel et al. is an improvement over the prior known techniques, Hartel et al. is subject to further improvement. Eliminating the need to override unnecessary non-normal checklists would decrease pilot confusion, improve crew workload during non-normal operating conditions and reduce crew training time. The present invention is directed to accomplishing this result. More specifically, the present invention is directed to decreasing crew workload when interacting with an ECL system during the presence of non-normal aircraft conditions.

SUMMARY OF THE INVENTION

In accordance with this invention, an electronic checklist system, and corresponding method for controlling the presentation of non-normal checklists produced by the crew alert system of complex equipment, such as an airplane, as a result of the complex equipment operating in a non-normal manner is disclosed. The electronic checklist system manages access to one or more non-normal checklists based on signals generated by the crew alert system in response to the non-normal operation of the complex equipment and based on predefined non-normal checklist status rules. The electronic checklist system determines the status of the two or more existing non-normal checklists based on the predefined non-normal checklist status rules, wherein the determined status is inhibited or uninhibited.

In accordance with other aspects of the present invention, a checklist icon is displayed, if the determined status of the existing non-normal checklist is uninhibited. If the determined status of the existing non-normal checklist is uninhibited, any operational notes of the existing uninhibited non-normal checklist are saved to a notes file, the existing uninhibited non-normal checklist is saved in a checklist queue, and any deferred items of the existing uninhibited non-normal checklist are saved to one or more predefined normal checklists.

In accordance with still other aspects of the present invention, the system displays the non-normal checklists saved in the checklist queue, and a non-normal checklist based on a selection from the displayed checklist queue.

In accordance with still yet other aspects of the present invention, the predefined non-normal checklist status rules are as follows:
  a first non-normal checklist is uninhibited if no other existing checklist includes an active inhibit attribute for the first non-normal checklist;
  if two or more of the existing non-normal checklists are a set of referring checklists, the first determined existing referring checklist in the set is uninhibited and the one or more other referring checklist in the set is inhibited; and
  an inhibit attribute is active if the non-normal checklist that contains the inhibit attribute is uninhibited and if the inhibit attribute is contained within a conditional line item within the uninhibited non-normal checklist, the conditional line item is determined true.

In accordance with further aspects of the present invention, an uninhibited non-normal checklist becomes inhibited, if another non-normal checklist that includes an inhibit attribute associated with the uninhibited non-normal checklist becomes active after the uninhibited non-normal checklist was determined to exist. If an uninhibited non-normal checklist becomes inhibited any operational notes of the uninhibited non-normal checklist are removed from a notes file, the uninhibited non-normal checklist is removed from the checklist queue, the checklist status icon is removed from the checklists' associated crew alert message, any deferred items of the uninhibited non-normal checklist are removed from one or more predefined normal checklists, and the state of the uninhibited checklist is preserved.

In accordance with further aspects of the present invention, the checklists can be modified with a remotely used software interface tool. The modified checklists can then be loaded into the system for updating prestored checklists.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The present invention is an improved electronic checklist (ECL) system that operates in conjunction with an operator (e.g., crew), an alert system to present normal checklists associated with normal operating conditions of complex equipment, such as an airplane, and more efficient presentation of non-normal checklists associated with one or more non-normal conditions of the complex equipment. The complex equipment includes various systems and subsystems, as well as interconnected systems. A non-normal checklist is assigned to each system and subsystem in the case of a detected failure of the respective system and subsystem. In the past, if a primary system fails causing failure of one or more of the primary system's subsystems, interconnected systems or secondary systems, non-normal checklists relating to all of the failed systems are retrieved from memory. That is, the non-normal checklist that relates to the primary system failure and the non-normal checklists that relate to the secondary system failures are retrieved. However, the completion of the retrieved non-normal checklist associated with primary system failure makes the execution of the checklists associated with the secondary system failures unnecessary. Execution of the secondary systems' checklists is unnecessary because the primary failure checklist includes all the steps, operational notes, and deferred items, described in more detail below, of the secondary failure checklists. The present invention is directed to the efficient presentation and execution of non-normal checklists relating to primary and secondary system failures.

Figure 2:
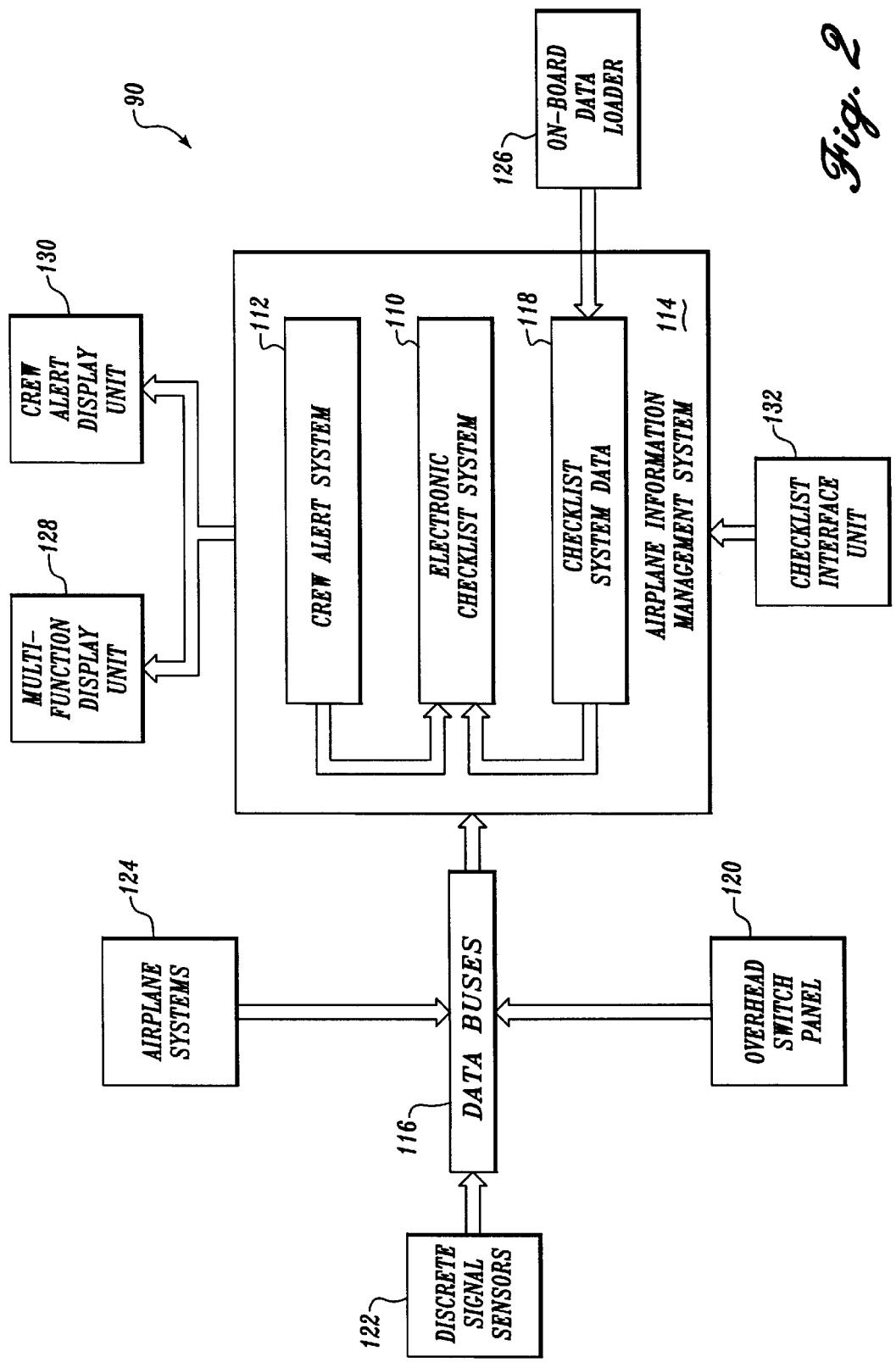
FIG. 2 is a block diagram depicting an electronic checklist system operatively interconnected with an airplane crew alert system, display units and various other airplane systems and equipment that are used in the practice of the invention.

FIG. 2 illustrates an airplane management system 90 suitable for employing an electronic checklist (ECL) system 110 formed in accordance with the present invention. The ECL system 110 and a crew alert system 112 are included in an airplane information management system 114. The Airplane Information Management System (AIMS) 114 includes one or more signal processing units and related system memory (both random access memory and read only memory) that are structurally and functionally interconnected in a conventional manner, but not shown for ease of illustration. Programs for processing data stored in system memory are also not shown. Data used during operation of the airplane information management system 114 also are stored in system memory. Data stored in memory, as expressly indicated in FIG. 2, includes checklist system data 118.

Data buses 116 that, preferably, structurally and functionally meet the requirements of ARINC 629, allow the airplane information management system 114 to access signals representative of the status (e.g., opened, closed, on, off) of various airplane switches and valves, such as the switches located on a flight deck overhead switch panel 120. These switches are of significance in the practice of the invention since some checklists call for verification that one or more switches located on the overhead switch panel 120 have been placed in an on or off state by the pilot or another member of the flight crew. The ECL system 110 monitors the state of various switches that are located on the overhead switch panel 120. During execution of a checklist in which one or more checklist items (i.e., checklist steps) require that a switch located on the overhead switch panel 120 be in a certain state, the ECL system 110 automatically notes completion of that step as soon as the associated switch is placed in the proper state. That is, the pilot or other crew member executing the checklist needs to take no action if the switch that is to be observed or monitored already is in the proper state. If the switch is not in the proper state, the ECL system 110 notes completion of the related checklist item as soon as the switch is activated by the pilot or crew member. Thus, no manual operation is required to confirm completion of such a checklist item. This and other checklist items are described in more detail below.

As is known to those skilled in the art, the airplane data buses 116 receive various signals from numerous airplane systems 124. Selected ones of these airplane system signals are monitored and processed by the crew alert system 112 in order to determine non-normal system conditions and report those conditions to the flight crew by means of visual or aural alerts. Visual crew alert message presentation is described in more detail below.

In the currently preferred embodiments of the present invention, the ECL system 110 is interfaced with the crew alert system 112 to receive signals representative of the status of each alert provided by the crew alert system 112 (i.e., whether a particular alert is or is not in effect). In addition, the ECL system 110 is interfaced with the crew alert system 112 so that the ECL system 110 can supply signals to the crew alert system 112 indicative of checklist status (i.e., whether a checklist associated with a crew alert has been completed; has been selected for execution, but has not been completed; has not yet been selected for execution; has been overridden; or is presently inhibited (no action required)).

The ECL system 110 receives data signals from the checklist system data 118. These data signals provide the ECL system 110 with information that includes system configuration information, a checklist index file that allows rapid retrieval and display of checklists, checklist text that provides the information items displayed by the ECL system 110, and checklist attribute information, such as an inhibit attribute. As shall be described in more detail below, the checklist attributes employed by the invention enable the ECL system 110 to achieve various system objectives. As previously noted, these objectives include efficient execution of non-normal checklists, and the ability to easily modify the ECL system 110 to suit the needs of a particular airline or other airplane user.

FIG. 2 indicates one way of providing ease of checklist system maintenance and modification. In particular, the arrangement of FIG. 2 includes an on-board data loader 126 that is coupled to the airplane information management system 114. The on-board data loader 126 supplies data to the checklist system data 118. The data supplied by the on-board data loader 116 can modify the checklists that are established by the ECL system 110.

As will be recognized by those skilled in the art, various devices can be used to realize the on-board data loader 126. For example, the on-board data loader 126 can be a conventional unit for reading magnetically encoded disks or tapes. Regardless of the type of on-board data loader 126 employed, the data supplied to the checklist system data 118 is formatted as replacement files. Preferably, the replacement files are established off-line, off-plane with a PC-type computer or similar device, with the computer being used as a database management tool that employs a graphical user interface. In the graphical user interface a user can add or delete checklist line items, change or add notes, add or delete checklists associated with an inhibited attribute, and create new checklists. An example of a graphical user interface is illustrated in FIGS. 8–11 and described in more detail below.

The currently preferred embodiment of the invention includes one display unit identified as a crew alert system display unit 130 and three multi-function display (MFD) units 128. In this arrangement, the crew alert system display unit 130 and the MFD units 128 are configured and arranged in a manner that is similar to the color monitors that are used in conventional computer and work station systems. The crew alert system display unit 130 displays crew alert messages and checklist status icons that correspond to non-normal checklists based on non-normal conditions perceived by the crew alert system 112. The MFD unit 128 displays normal and non-normal checklists, checklist selection menus, other checklist information, and command buttons.

A checklist interface unit 132 allows the flight crew to interact with normal and non-normal checklists on the MFD unit 128. In the currently preferred embodiments of the invention, checklist interface unit 132 includes a pointing device such as a ball, joystick, up/down-left/right control keys, or touch pad with activation button (not shown in FIG. 2). The pointing device serves as a cursor control for a cursor or other indicia that is generated by the ECL system 110. In the currently preferred embodiments, the cursor can be moved over the face of the MFD unit 128. A displayed item is selected by depressing a switch or similar device that is included with the checklist interface unit 132, when the cursor is within the vicinity of the displayed item.

The system described above provides rapid and accurate selection of a non-normal checklist associated with a primary system failure or non-normal condition, while inhibiting all checklists associated with secondary system failures or non-normal conditions resulting from the primary non-normal condition or resulting from crew actions prescribed in the primary checklist. The inhibiting functionality is described in more detail below.

In order to better understand the following description, the following definitions are used. A retrieved non-normal checklist is a checklist that is uninhibited according to the occurring non-normal conditions, but not yet displayed on the MFD unit 128. A selected non-normal checklist is a retrieved checklist that is displayed on the MFD unit 128 for flight crew execution. One or more inhibit attributes are included in a non-normal checklist, if the checklist designer determined that the execution of that non-normal checklist makes the execution of the one or more other non-normal checklists unnecessary. Preassignment of inhibit attributes within a checklist is initially performed by a checklists' system editor based on analysis of aircraft systems and procedures as they pertain to non-normal operating conditions. These preassigned inhibit attributes may be edited by a user as shown in FIGS. 8–11 and as described in more detail below.

Figure 3A:
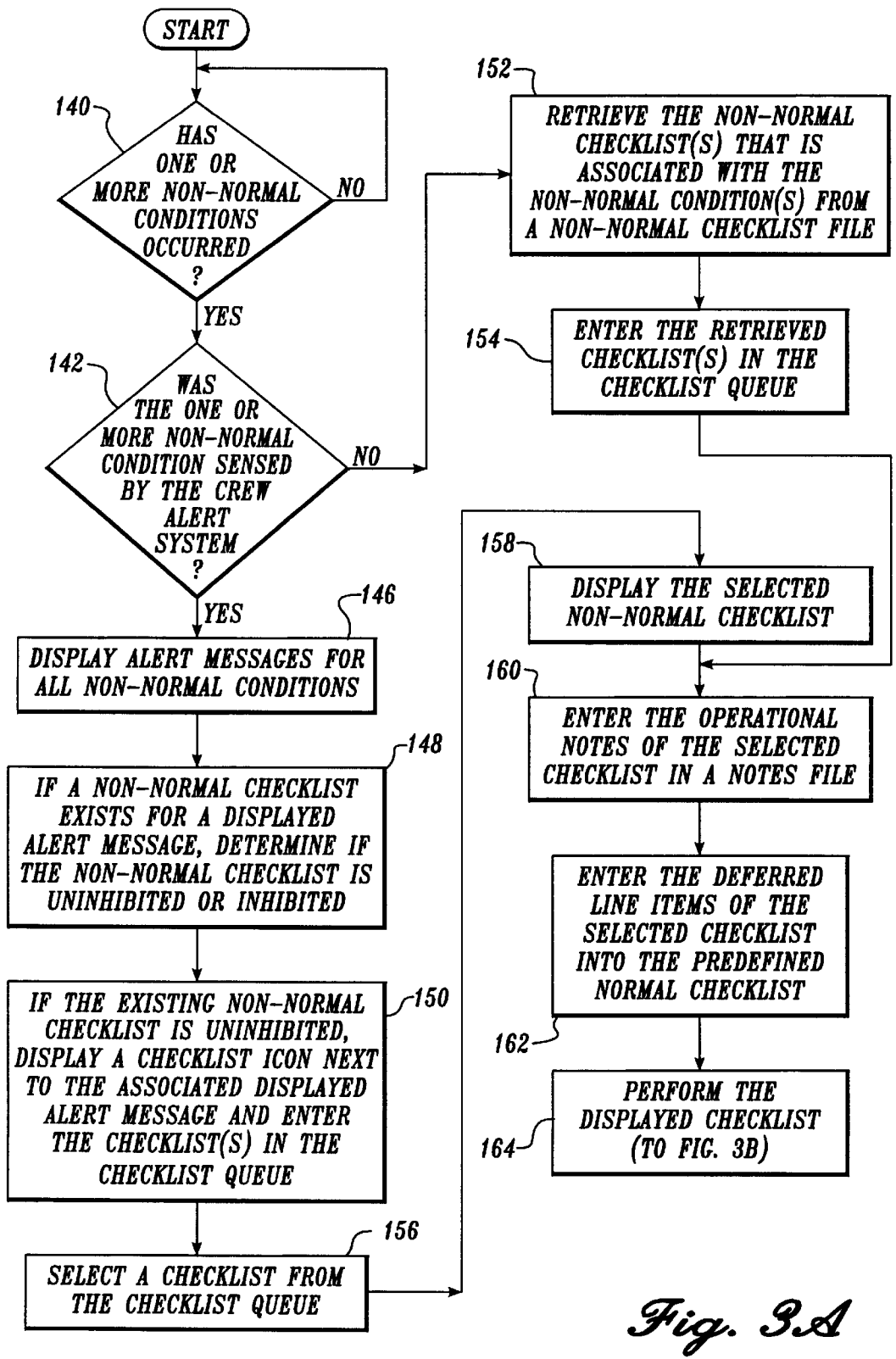
FIGS. 3A–D are flow diagrams illustrating the operation of an electronic checklist system formed in accordance with this invention in response to non-normal operating conditions.

FIGS. 3A–3D illustrate the process performed by the ECL system. Referring to FIG. 3A, at decision block 140, the process begins when one or more non-normal conditions have occurred. If no non-normal conditions have occurred, the present invention waits until a non-normal condition has occurred.

If, at decision block 142, one or more non-normal condition was sensed by the crew alert system 112, crew alert messages are displayed on the crew alert display unit 130 (see block 146) and the following initial ECL system responses occur:

at block 148, if a non-normal checklist exists for a displayed alert message, the ECL system 110 determines if the non-normal checklist is inhibited or uninhibited according to the inhibit rules described below.

at block 150, non-normal checklist status icons appear for uninhibited checklists next to the appropriate crew alert messages and the uninhibited checklist is entered into the checklist queue.

Now that the checklist(s) have been determined for the non-normal condition(s), the crew begins executing those checklists entered into the checklist queue. First, at block 156, the crew selects a checklist from the checklist queue using the checklist interface unit 132.

If at decision block 142, the crew alert system 112 did not sense the non-normal condition (i.e., the crew sensed the non-normal condition), the crew will retrieve the non-normal checklist that is associated with the crew sensed non-normal condition. See block 152. The non-normal checklists are retrieved from a non-normal checklist file stored within the ECL system 110. At block 154, the retrieved checklist is entered into the checklist queue. Then, at block 158, the retrieved checklist is displayed.

Next, at block 160, any operational notes of the selected checklist are collected into a notes file, and, at block 162, any deferred line items of the selected checklist are added to the predefined normal checklist. At block 164, the crew reads and executes the line items of the displayed checklist. Checklist execution or performance is described in more detail below in FIG. 3B.

Rules for Placing a Non-Normal Checklist in the
Checklist Queue (i e., Uninhibited Checklists)

1. Primary Non-Normal Checklists

A. The solution to the non-normal condition can only be resolved by the associated non-normal checklist. This is true under two situations. First, the non-normal checklist is preassigned to be the only non-normal checklist to resolve a non-normal condition, no matter what other non-normal conditions with existing non-normal checklists are present. Second, the non-normal checklist has a preassigned inhibit attribute included in one or more other non-normal checklists (other checklists that, when executed, make execution of this non-normal checklist unnecessary) and those other non-normal checklists are not presented for execution because their associated non-normal condition did not occur or those other checklists became overridden after they were presented for execution.

2. Referring Checklists

If a first non-normal checklist has an inhibit attribute for a second non-normal checklist and vice versa, the first non-normal checklist inhibits the second non-normal checklist only when the first non-normal checklist is retrieved before the second non-normal checklist and no other checklist in the checklist queue has an inhibit attribute for the first non-normal checklist. Otherwise, the second non-normal checklist will inhibit the first non-normal checklist provided no other checklist in the checklist queue has an inhibit attribute for the secondary checklist. Referring checklists occur when two similar non-normal conditions occur and the execution of either's non-normal checklist makes the execution of the other's non-normal checklist unnecessary.

3. Conditional Items

Figure 6:
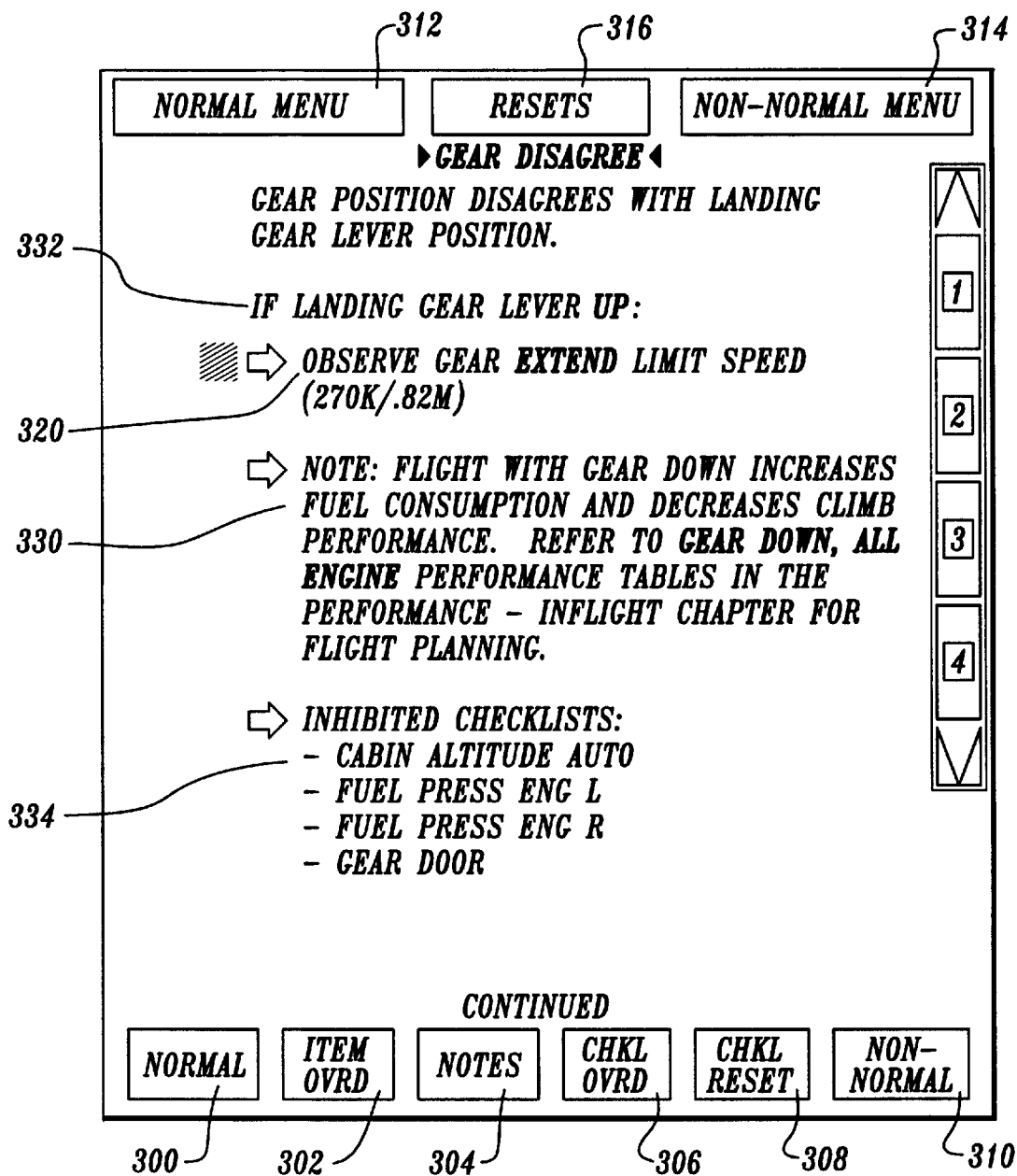
FIG. 6 is a screen shot of a checklist created by an electronic checklist system formed in accordance with the present invention.

Conditional items within a selected checklist can affect the status of other non-normal checklists that are identified by inhibit attributes within the conditional items of the selected checklists. Initially all checklists that are associated with inhibit attributes in any uninhibited checklist are inhibited. If the uninhibited checklist is subsequently selected, and contains a conditional item that is determined to be true, all checklist inhibit attributes associate with the true conditional item remain activated and the non-normal checklists associated with those inhibit attributes remain inhibited. Conversely, the non-normal checklists associated with the inhibit attributes associated with an untrue conditional item become uninhibited. An example conditional item is illustrated in FIG. 6 and described in more detail below. Preassignment of inhibit attributes within a checklist is initially performed by a checklists' system editor based on analysis of aircraft systems and procedures as they pertain to non-normal operating conditions. These preassigned inhibit attributes may be edited by a user as shown in FIGS. 8–11 and described below.

Figure 3B:
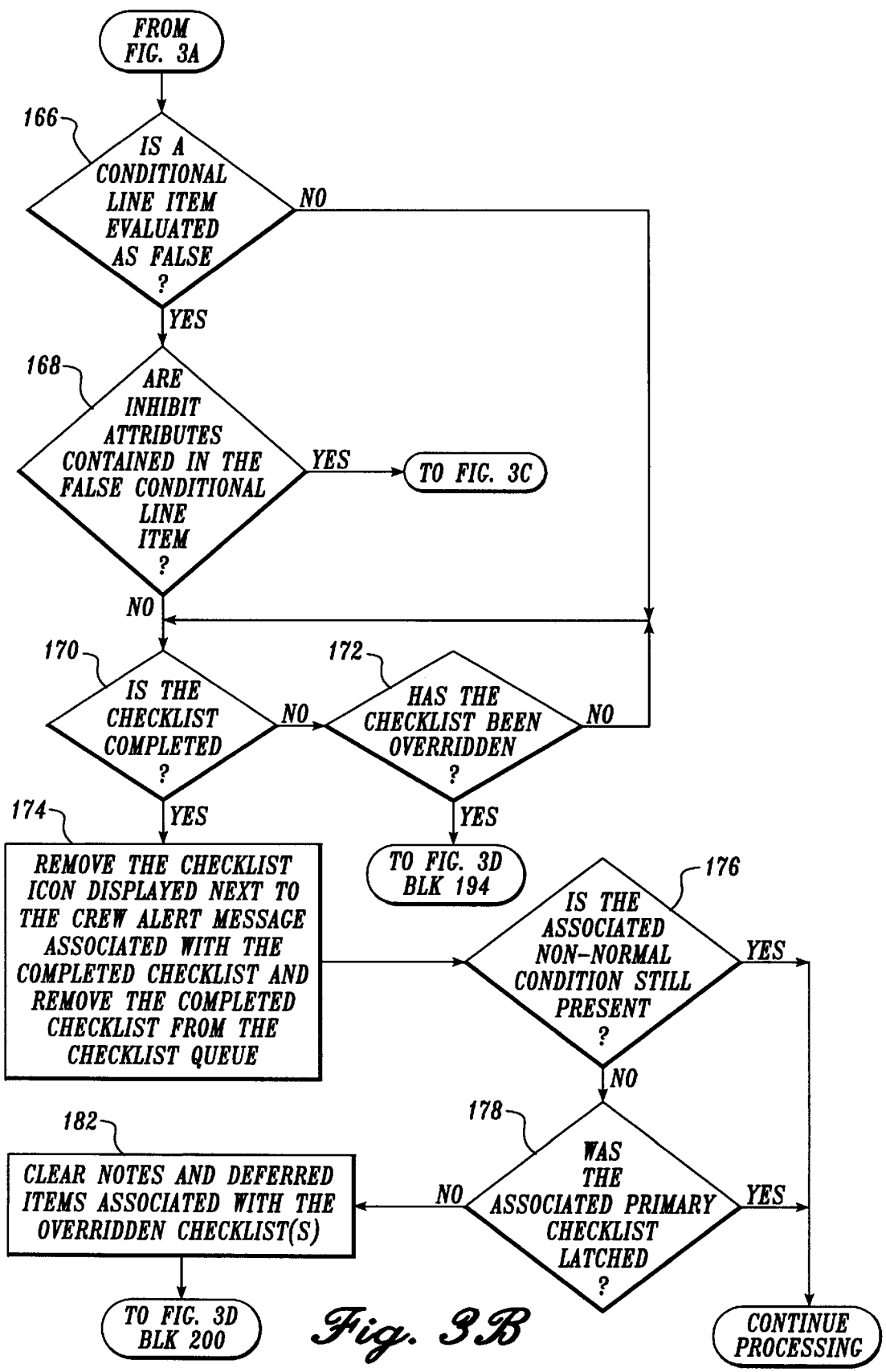

Checklist completion is shown in FIG. 3B. At decision block 166, if the selected checklist includes conditional line items, the status, true/false, of the conditional line items is determined. If a conditional line item is true, the process continues to decision block 170, described below. If the conditional line item is false, the process continues to decision block 168. Decision block 168 determines whether inhibit attributes are contained within the false conditional line item. If an inhibit attribute is contained within the false conditional line item, the process goes to FIG. 3C. If no inhibit attributes were contained in the false conditional line item, the process goes to decision block 170.

At block 170, the ECL system determines whether the primary checklist has been completed. Checklist completion is determined after all required line items within the checklist have been completed. If the checklist is not complete, the ECL system determines if the checklist has been manually overridden. See decision block 172. If the checklist is overridden, the process continues as described at block 194 in FIG. 3D. If the checklist has not been overridden, the ECL system waits for the checklist to be completed or overridden.

The following initial ECL system responses occur when a checklist is completed: at block 174, the checklist status icon displayed next to the crew alert message associated with the completed checklist is removed; and the completed checklist is removed from the checklist queue.

The ECL system continuously monitors the alert level messages to determine if the non-normal condition is still active. If the alert level message remains active, (the non-normal condition still remains) the inhibits that are being invoked by the completed checklist remain active and crew checklist processing continues. See decision block 176. At this point, the ECL system 110 continues processing and determining whether the checklist with the active inhibit attribute has not been inhibited by a higher level checklist (i.e., the ECL system 110 is determining if inhibits should remain active). If the alert level message goes inactive (the non-normal condition has been cleared), the ECL system 110 determines whether or not the checklists associated with the inactive alert level message are latched. See decision block 178. Typically, checklists associated with non-normal conditions that require immediate pilot action are latched. When these types of non-normal conditions occur, the pilot or crew perform the steps of the checklist immediately from memory. If a checklist of this type was not latched, the crew would not have the chance to review the associated notes and deferred items. If the checklist is latched, the inhibit attributes therein remain active and the ECL system 110 continues processing and determining whether the checklist invoking the inhibits has not been inhibited by a higher level checklist. If the checklist is not latched, any operational notes and deferred line items associated with the primary checklist are removed from their respective locations. See block 182. The process continues to decision block 200 in FIG. 3D.

Figure 3C:
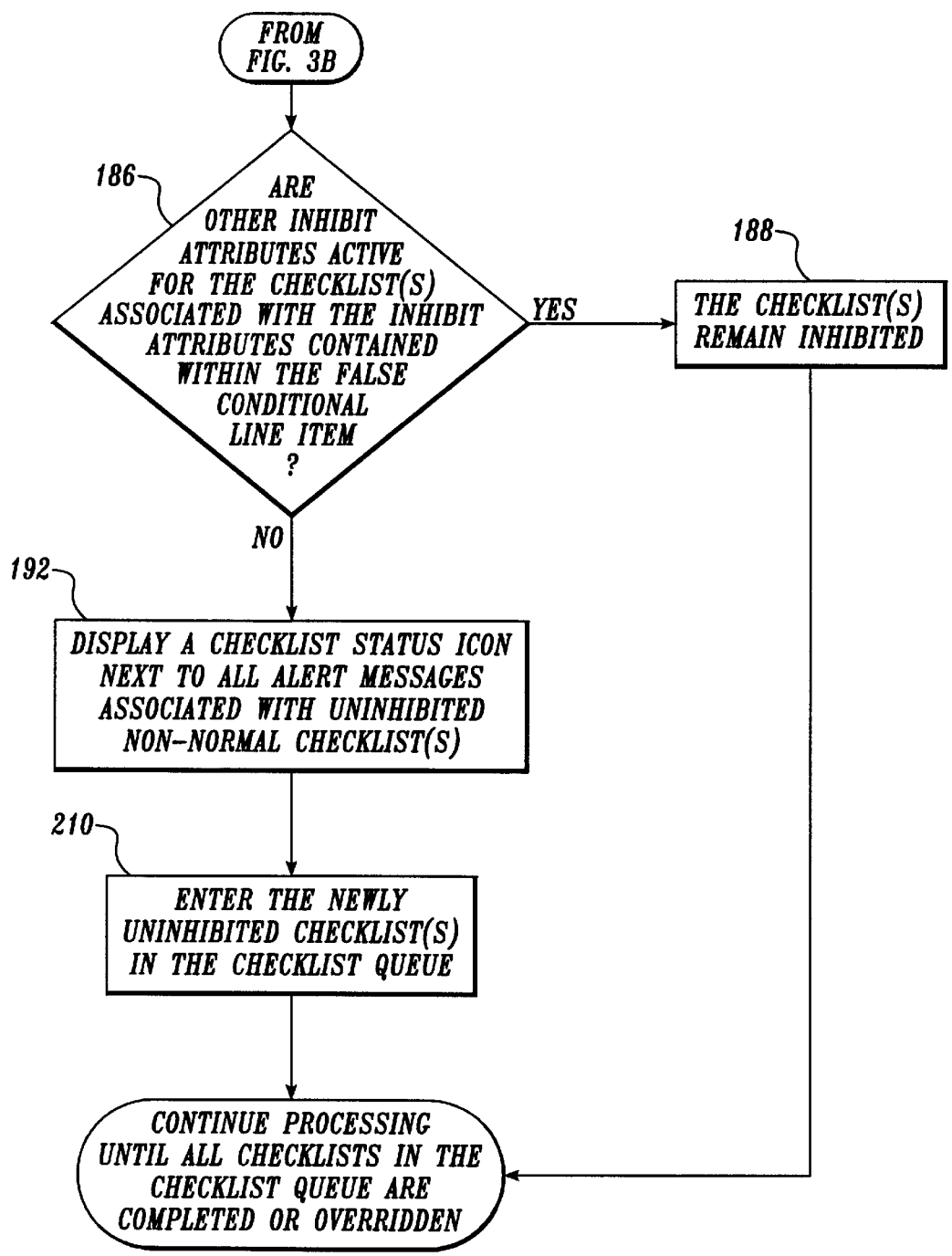

As shown in FIG. 3C, the ECL system 110 determines if other inhibit attributes are active in another uninhibited checklist. See decision block 186. If inhibit attributes are active in another uninhibited checklist, at block 188, the checklist associated with the inhibit attribute remains inhibited, even though the conditional item was evaluated false. If no additional active inhibit attributes exist, the checklist(s) associated with the inhibit attribute(s) within the false conditional line item become uninhibited. As a result, at block 192, a checklist status icon is displayed next to the crew alert message(s) associated with the newly uninhibited checklist(s), and at block 210, the newly uninhibited checklist(s) is placed in the checklist queue.

At this point, the ECL system continues processing the newly uninhibited checklist(s), allowing the checklist(s) to become selected, completed, overridden, or re-inhibited.

Figure 3D:
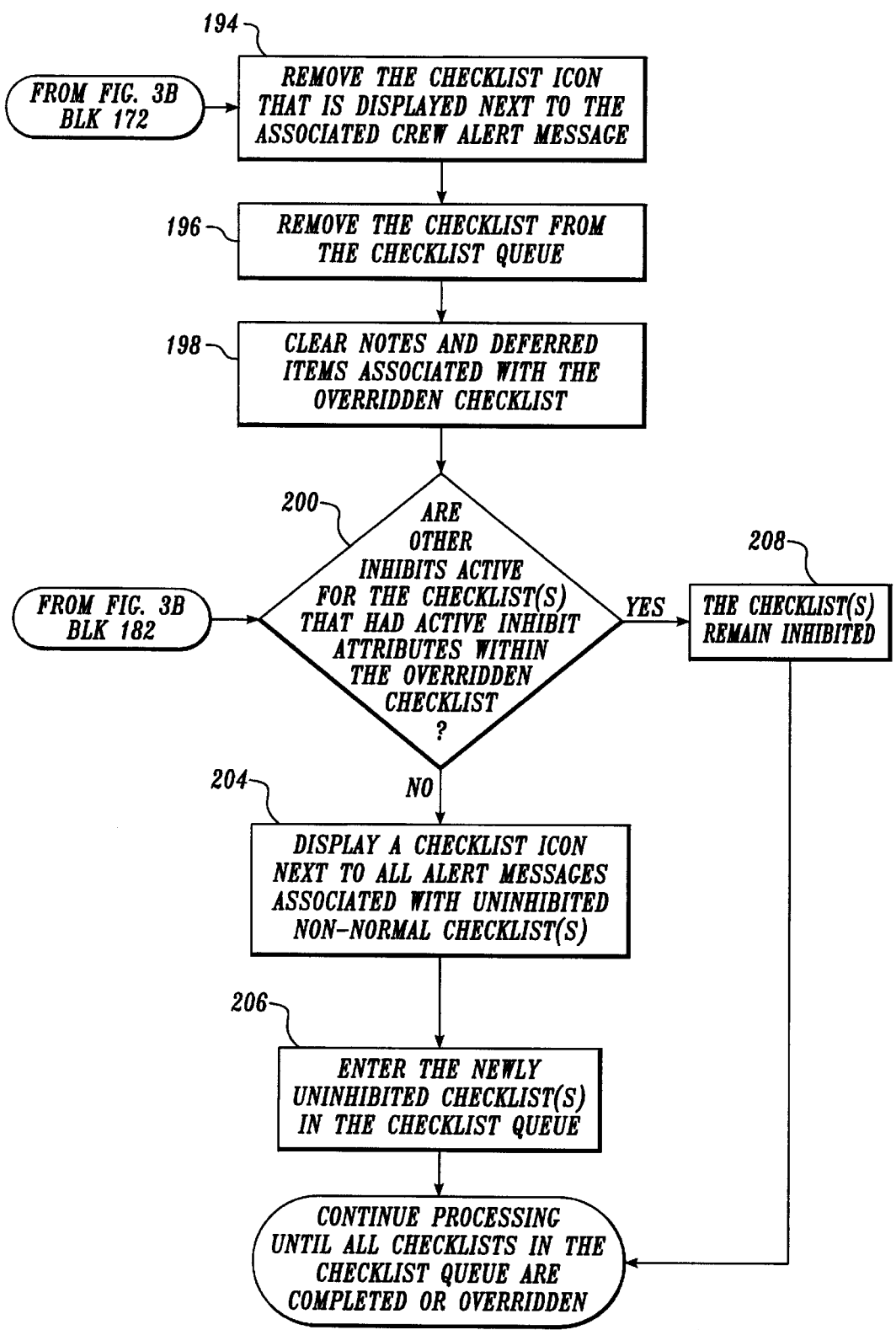

FIG. 3D shows the remaining steps performed by the ECL system 110. At block 194, the checklist status icon is removed from the associated crew alert message associated with the overridden checklist (from decision block 172, FIG. 3B). Then, at block 196, the overridden checklist is removed from the checklist queue and at block 198, the operational notes and deferred line items associated with the overridden checklist are removed. At decision block 200, the ECL system 110 searches a checklist inhibit file to determine if there are any other uninhibited checklists that are currently inhibiting the checklist that was inhibited by the completed or overridden checklist. If no other inhibits exist, the previously inhibited checklist(s) becomes uninhibited. Next, at block 204, a checklist status icon is displayed next to the crew alert message(s) associated with newly uninhibited checklist(s), and, at block 206, the newly uninhibited checklist(s) is placed in the checklist queue.

Figure 4:
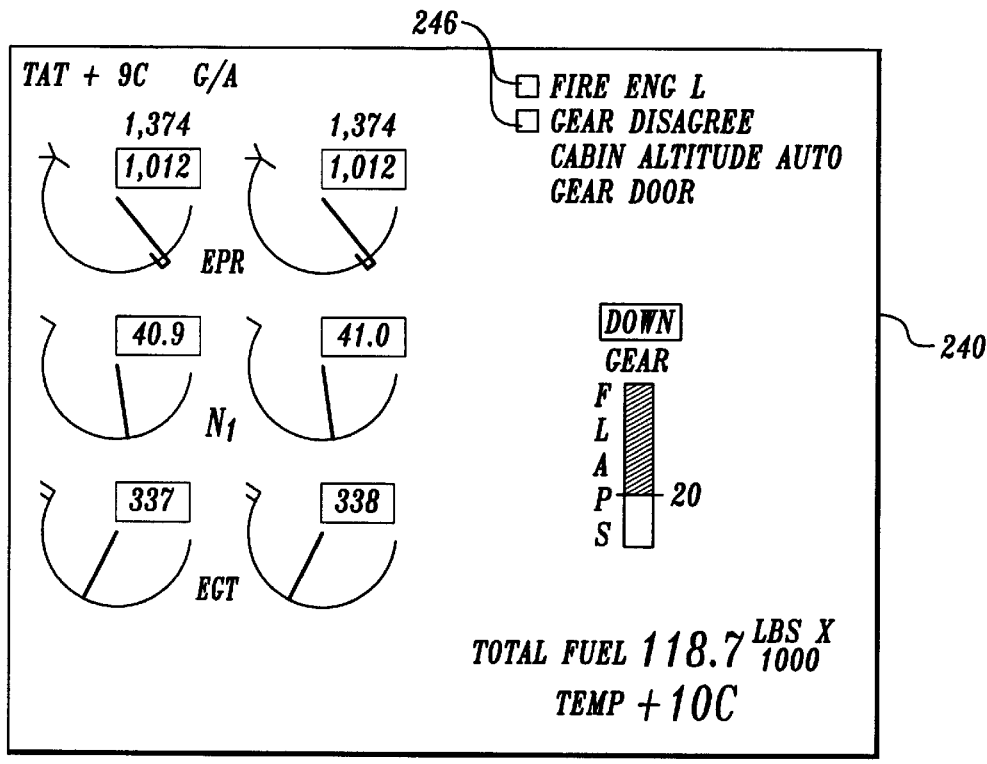
FIG. 4 is a screen shot of an Engine Indicating and Crew Alerting System (EICAS) presenting an example of crew alert messages created by an EICAS and checklist status icons created by an electronic checklist system formed in accordance with the present invention.
Figure 5:
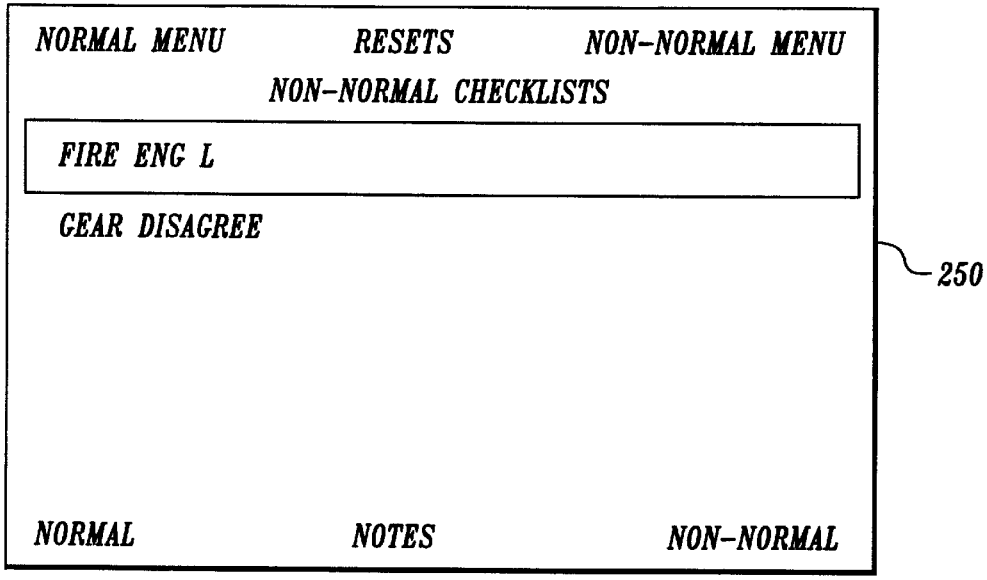
FIG. 5 is a screen shot of a multi-function display containing a checklist queue based on the crew alert messages shown in FIG. 4.

If at decision block 200, the ECL system 110 determines that additional inhibits are active, at block 208, the checklist remains inhibited and the ECL system 110 continues processing to determine inhibit eligibility. FIGS. 4–6 illustrate examples of the processes above and are described in more detail below.

Checklists include checklist action items, various command buttons, and page control buttons that are activated by moving the cursor to the vicinity of the item to be activated and depressing a switch or similar device that is included in the checklist interface unit 132 (FIG. 2). These features are illustrated below. There are two types of checklist action items: "open-loop" items, which require the flight crew to manually check-off the item to confirm that the required action has been taken or that the required condition has been achieved; and, "closed-loop" items (not shown) in which the ECL system senses that the required condition has been achieved and automatically confirms completion of the checklist item. In the currently preferred embodiments of the invention, open-loop checklist action items are identified by a small shaded square that is located immediately to the left of the line item (or by other visibly discernible indicia). Closed-loop line items are not identified by a symbol.

FIG. 4 is an example of a screen shot of an Engine Indicating Crew Alerting System (EICAS) display 240 currently employed in various types of commercial airplanes, such as the Boeing aircraft model 777. The EICAS display 240 corresponds to the crew alert display unit 130 included in FIG. 2 and described above. The EICAS displays all crew alert messages that relate to any occurring non-normal conditions. In this example, the non-normal conditions that have occurred cause the crew alert system to display on the EICAS display 240 FIRE ENG L, GEAR DISAGREE, CABIN ALTITUDE AUTO, and GEAR DOOR crew alert messages in a crew alert message area of the EICAS display 240. The checklists that correspond to the displayed crew alert messages have a predefined association with the occurring non-normal conditions detected (fire in left engine, landing gear sensors disagree with landing gear lever position, automatic cabin altitude control malfunction, improper gear door position, respectively). Checklist status icons 246 are displayed adjacent to crew alert messages FIRE ENG L and GEAR DISAGREE because their associated conditions are unrelated and completion of either will not resolve the condition associated with the other. Thus, only the FIRE ENG L and GEAR DISAGREE checklists require pilot action. The CABIN ALTITUDE AUTO and GEAR DOOR checklists are inhibited by the GEAR DISAGREE checklist. The CABIN ALTITUDE AUTO and GEAR DOOR checklists are inhibited by the GEAR DISAGREE checklist because the execution of the GEAR DISAGREE checklist may make the execution of the CABIN ALTITUDE AUTO and GEAR DOOR checklists unnecessary. At this point, it is impossible for the crew to determine whether the execution of the GEAR DISAGREE checklist will resolve the conditions associated with inhibited checklists CABIN ALTITUDE AUTO and GEAR DOOR. The only action required by the crew is to complete the checklists that have a checklist status icon. The crew alert messages are first displayed by their level of priority and then within each level of priority the crew alert messages are displayed in the time order of occurrence. Crew alert messages are displayed by when they were determined to be pertinent. Crew alert message displaying as well as other features of the crew alert and ECL system are described in U.S. Pat. No. 5,454,074, which is incorporated herein by reference.

In order to access the required action checklists, the flight crew commands the MFD unit 128 to present the checklists for execution. In one embodiment of the present invention, the checklists are retrieved by selecting the CHKL button on a display select panel (DSP) (not shown) that controls the MFD unit 128. After selection of the CHKL button, as shown in FIG. 5, a checklist queue containing the checklists that were identified with a checklist status icon in the associated crew alert message (FIG. 4)—FIRE ENG L and GEAR DISAGREE—are displayed. If only one checklist had a checklist status icon presented adjacent to the checklist's associated crew alert message, the system would not display the checklist queue. Rather only the one checklist would be displayed.

FIG. 6 is a screen shot of the first page of the GEAR DISAGREE checklist selected by the pilot from the displayed checklist queue by activating a cursor controlled by the checklist interface unit 132 (FIG. 2). As shown in FIGS. 5 and 6, system command buttons (i.e., NORMAL button 300, ITEM OVRD button 302, NOTES button 304, CHKL OVRD button 306, CHKL RESET button 308, NON-NORMAL button 310, NORMAL and NON-NORMAL MENU button 312, 314, RESETS button 316) are displayed along with checklists and the checklist queue, when applicable. The system command buttons allow the pilot or other crew members substantial control over the operation of the ECL system. In this regard, activation of the NORMAL button 300 provides in sequence access to the next normal checklist. For example, if the airplane is at its destination, the shutdown checklist might be the next normal checklist. Activation of the ITEM OVRD button 302 overrides an item highlighted in the checklist. The NOTES button 304 is displayed whenever non-normal checklists that contain operational notes have been selected. Operational notes that have been stored to the notes file are displayed by the MFD unit 128 when the NOTES button 304 is activated. Activation of the CHKL OVRD button 306 causes a displayed checklist to be overridden. When a checklist is overridden, all the notes and deferred line items of the overridden checklist are removed from the notes file and the predefined normal checklist, respectively. Also, the checklist is removed from the checklist queue and any inhibit attributes are reset, if present. Activation of the CHKL RESET button 308 resets the presently displayed checklist.

The NON-NORMAL button 310 is displayed if other uncompleted non-normal checklists remain on the checklist queue. Activation of the NON-NORMAL button 310 results in the display of the checklist queue if more than one uncompleted non-normal checklists remain, or results in the display of the remaining checklist if only one uncompleted non-normal checklist remains.

Activation of the NORMAL MENU button 312 by the pilot or crew member results in the display of a menu that lists the normal checklists and activation of the NON-NORMAL MENU button 314 results in display of a menu that lists the non-normal checklists. Various submenus can be accessed from the menus to provide the capability of selecting, displaying and executing unannunciated checklists and, in addition, provide a browse feature that allows the pilot or other crew members to view non-normal checklists that are associated with crew alert messages that are not currently active.

Checklists may also include deferred items, operational notes, sensed and not-sensed conditional items and inhibit checklist items. As shown in FIG. 6, inoperative items (i.e., notes), such as item 330, or limitations are displayed in the non-normal checklist and automatically collected in a notes file for future access by the pilot. Some non-normal checklists include steps that must be accomplished prior to landing or some other future occurring normal event. These steps are deferred items (not shown). For example, in a center system hydraulic failure one of the steps is to extend the landing gear using the alternate system. This step is not practical to perform at the time it occurred unless that time is right before landing. Therefore, this step is deferred to the normal approach checklist.

Sensed conditional items are automatically sensed and executed by the ECL system. Item 332 is an example of a sensed conditional item. A not-sensed conditional item includes a yes, no or some other user activated response. For example, in a fuel imbalance checklist (not shown), the conditional item "Fuel leak suspected" is a not-sensed conditional item because it includes a yes and no exclusive selection button that must be selected by the flight crew.

The final checklist item is an inhibit checklist line item. Inhibit checklist line item 334 presents a list of checklists that were preassigned to be inhibited by the GEAR DISAGREE checklist.

The inhibit feature or attribute can be activated a number of ways by a checklist. The activation can occur as soon as the checklist is determined to be uninhibited. For example, the checklists CABIN ALTITUDE AUTO, FUEL PRESS ENG L, FUEL PRESS ENG R, and GEAR DOOR are initially inhibited when GEAR DISAGREE is determined to be uninhibited, then the inhibit is reevaluated when the conditional item 332 is evaluated. If the conditional item is evaluated true, the inhibit remains; if the conditional item is evaluated false, the inhibit is cleared provided no other inhibits are active for the listed checklists.

Figure 1:
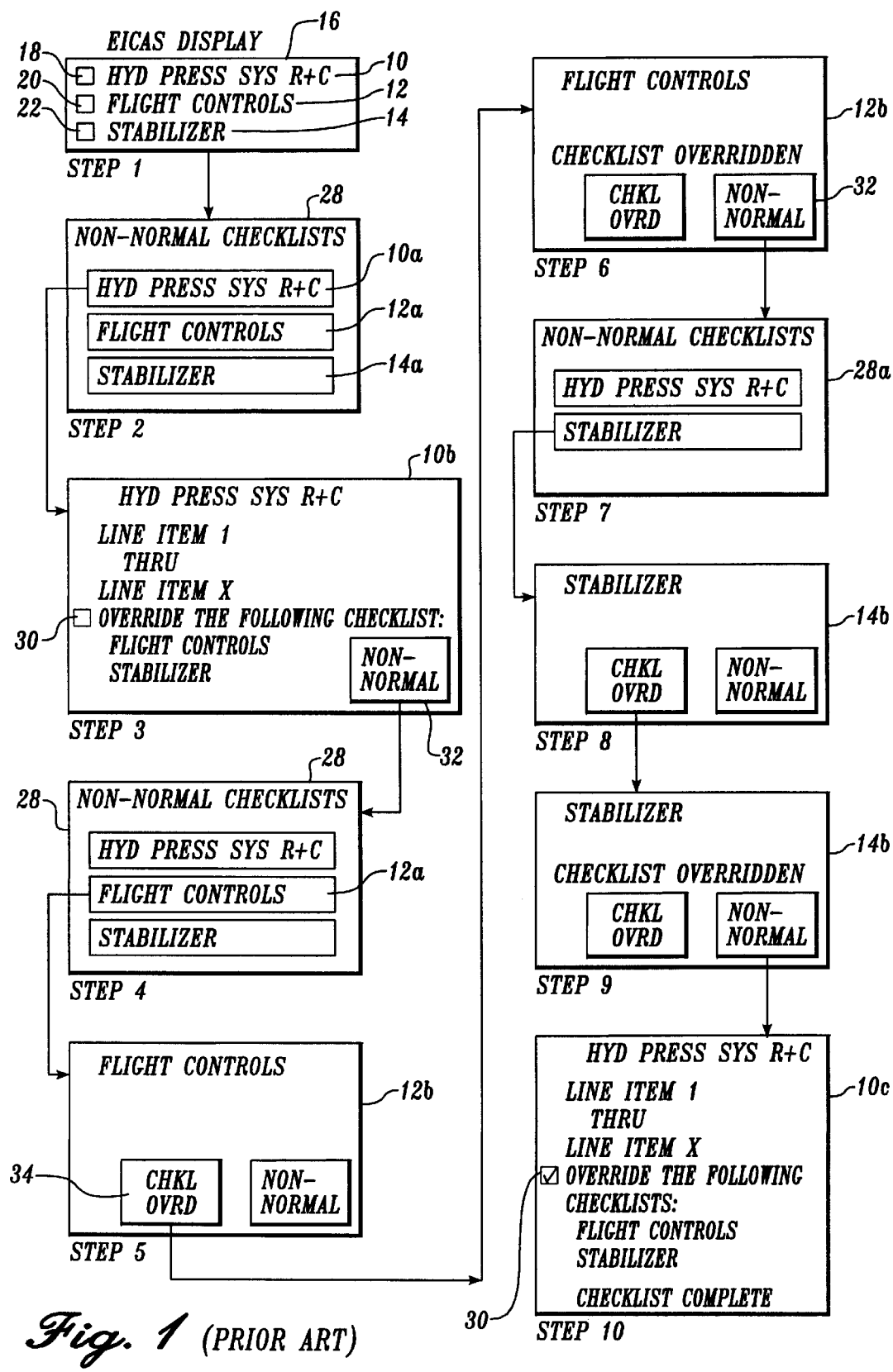
FIG. 1 is an example of a prior art electronic checklist execution process.
Figure 7:
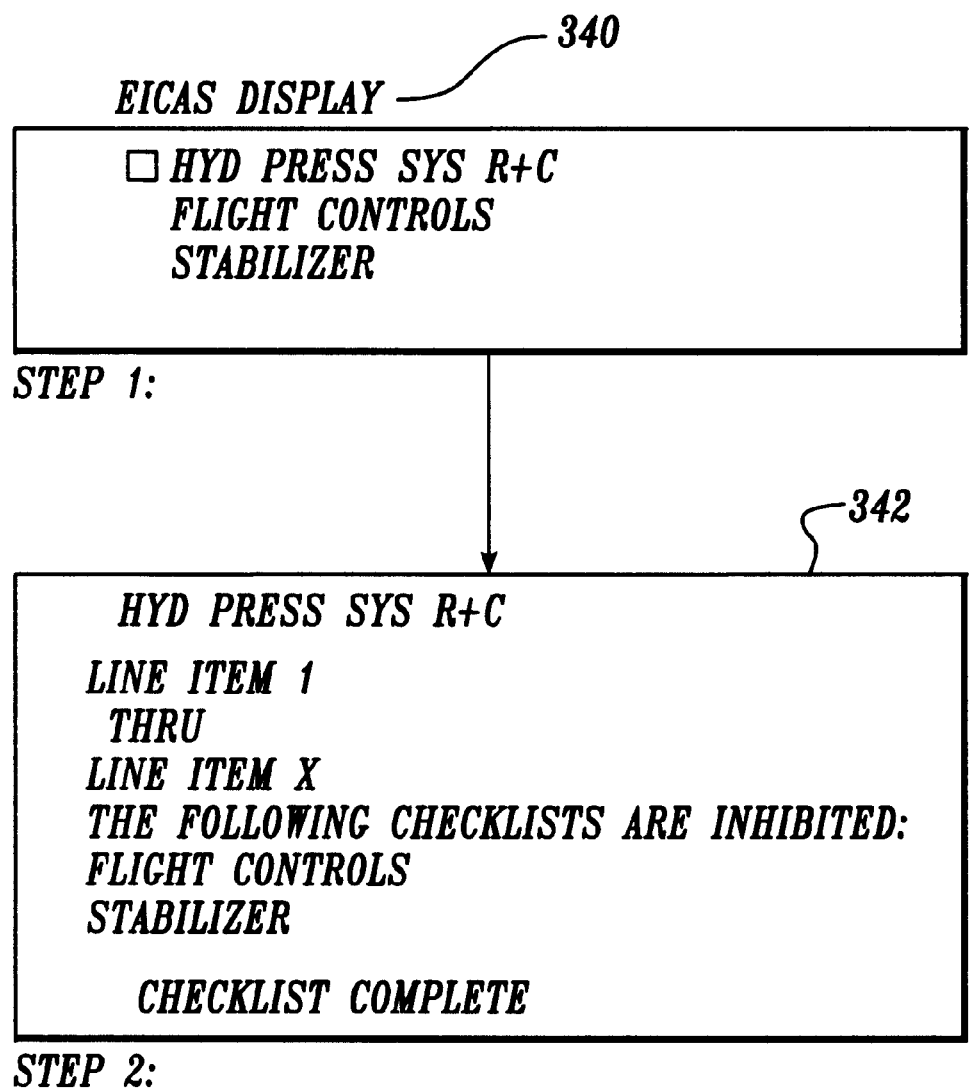
FIG. 7 illustrates the example of FIG. 1 performed using an electronic checklist system formed in accordance with the present invention.

FIG. 7 illustrates the scenario depicted in FIG. 1 but performed in accordance with the present invention. Unlike FIG. 1, in FIG. 7 only the non-normal checklist (HYD PRESS SYS R+C) displayed on the EICAS display 340 has an associated checklist status icon. The FLIGHT CONTROLS and STABILIZER checklists do not include an associated checklist status icon because the FLIGHT CONTROLS and STABILIZER checklists are inhibited by the HYD PRESS SYS R+C checklist. The FLIGHT CONTROLS and STABILIZER checklists are inhibited by the HYD PRESS SYS R+C checklist because the FLIGHT CONTROLS and STABILIZER checklists are secondary to the HYD PRESS SYS R+C checklist. In the first step, the pilot views the information displayed within the EICAS display 340, then selects the CHKL button on the Display Select Panel (not shown) which causes the HYD PRESS SYS R+C checklist 342 to be displayed on the MFD unit 128. If more than one crew alert message appeared with a checklist status icon on the EICAS display 340, the checklist queue would be presented for the user to select from the more than one checklist with a checklist status icon. The second and last step that the pilot must perform is the execution of the presented HYD PRESS SYS R+C checklist 342. The bottom of the HYD PRESS SYS R+C checklist 342 lists the inhibited checklists FLIGHT CONTROLS and STABILIZER. Once the pilot has completed the HYD PRESS SYS R+C checklist 342, no further action is required because the non-normal conditions associated with the FLIGHT CONTROLS and STABILIZER checklists have been addressed in the HYD PRESS SYS R+C checklist.

If the non-normal condition associated with HYD PRESS SYS R+C checklist no longer exists and the non-normal condition associated with the FLIGHT CONTROLS checklist remains after removal of the HYD PRESS SYS R+C crew alert message on the EICAS display 340, a checklist status indicator icon is displayed with the FLIGHT CONTROLS crew alert message on the EICAS display 340 thereby requiring completion by the flight crew. If this should occur, the condition that caused the FLIGHT CONTROLS checklist to be retrieved was different than the condition that caused the HYD PRESS SYS R+C checklist to be retrieved. Therefore, the flight crew must separately execute the FLIGHT CONTROLS checklist in order to properly address the associated condition.

Figure 8:
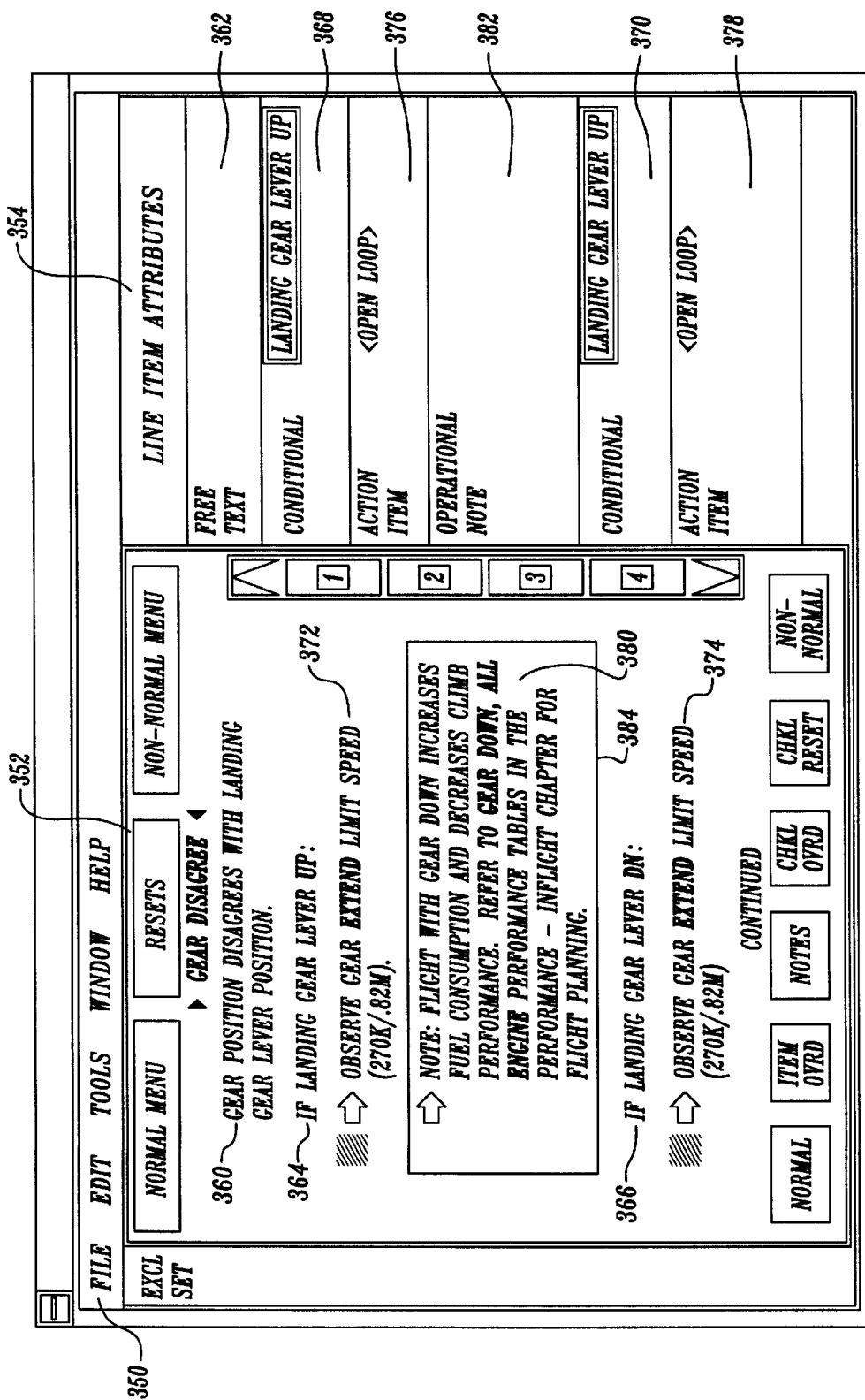
FIGS. 8–11 are screen shots of an off-line graphical user interface formed in accordance with the present invention.

FIGS. 8–11 are screen shots of a graphical user interface used to remotely modify checklists. As shown in FIG. 8, the graphical user interface is an application program executed in a window 348 of a windows-based operating system. The graphical user interface is operable on a stand alone personal computer. The window 348 includes a pull-down menu bar 350, an ECL checklist display area 352, and a working area 354. The ECL checklist display area 352 displays a checklist as it will actually appear on an airplane's MFD unit 128 (FIG. 2). The working area 354 allows a user to create and edit checklist line items that appear in a displayed ECL checklist using commands included in the pull-down menu bar 350.

If no other editing functions have been selected, attribute information is displayed in the working area 354. The displayed attribute information is attribute information of each line item in the checklist displayed in the ECL checklist display area 352. For example, line item 360 is free text as indicated by attribute information 362 that lies vertically co-parallel with line item 360 in window 350. Similarly, line items 364 and 366 are conditional line items as indicated by the corresponding displayed attribute information 368 and 370. Line items 372 and 374 are both open loop actions as indicated by corresponding displayed attribute information 376 and 378. Line item 380 is an operational note as indicated by corresponding displayed attribute information 382. A user can edit and create line items as described above according to techniques in the art.

In the graphical user interface the user can also enter and edit inhibit attribute line items that include a list of checklists that are to be inhibited by the checklist in which they appear. The user enters an inhibit attribute line item by first identifying where in the ECL checklist display area 352 the inhibit attribute line item will appear. As shown in FIG. 8, the user has selected line item 380, as indicated by surrounding box 384, as the line item that will proceed the inhibit attribute line item to be entered. Then, the user selects from the pull-down menu bar 350 the attribute titled "inhibit checklist" (not shown) which retrieves window 416 displayed in the screen shot shown in FIG. 9.

Figure 9:
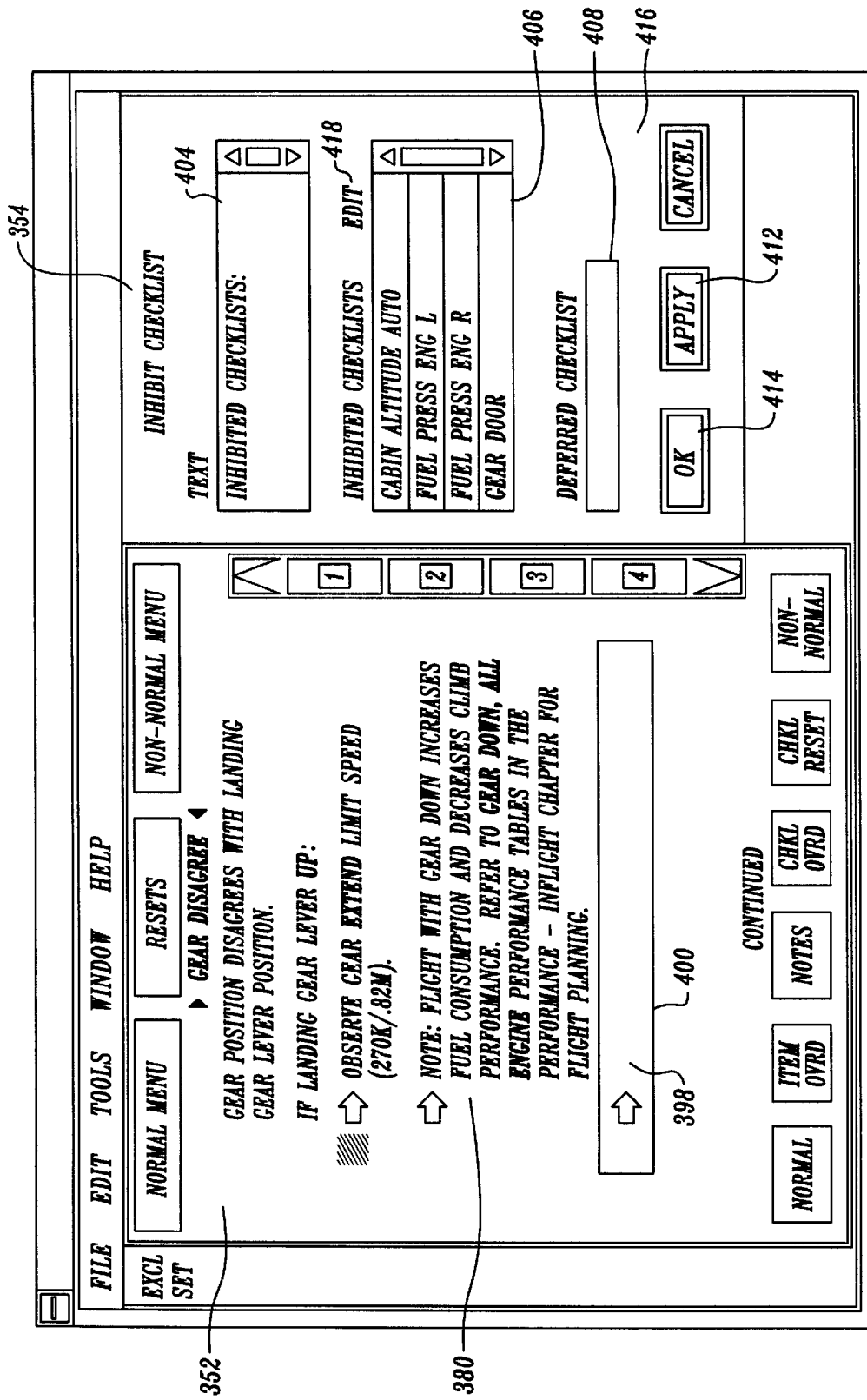
Figure 10:
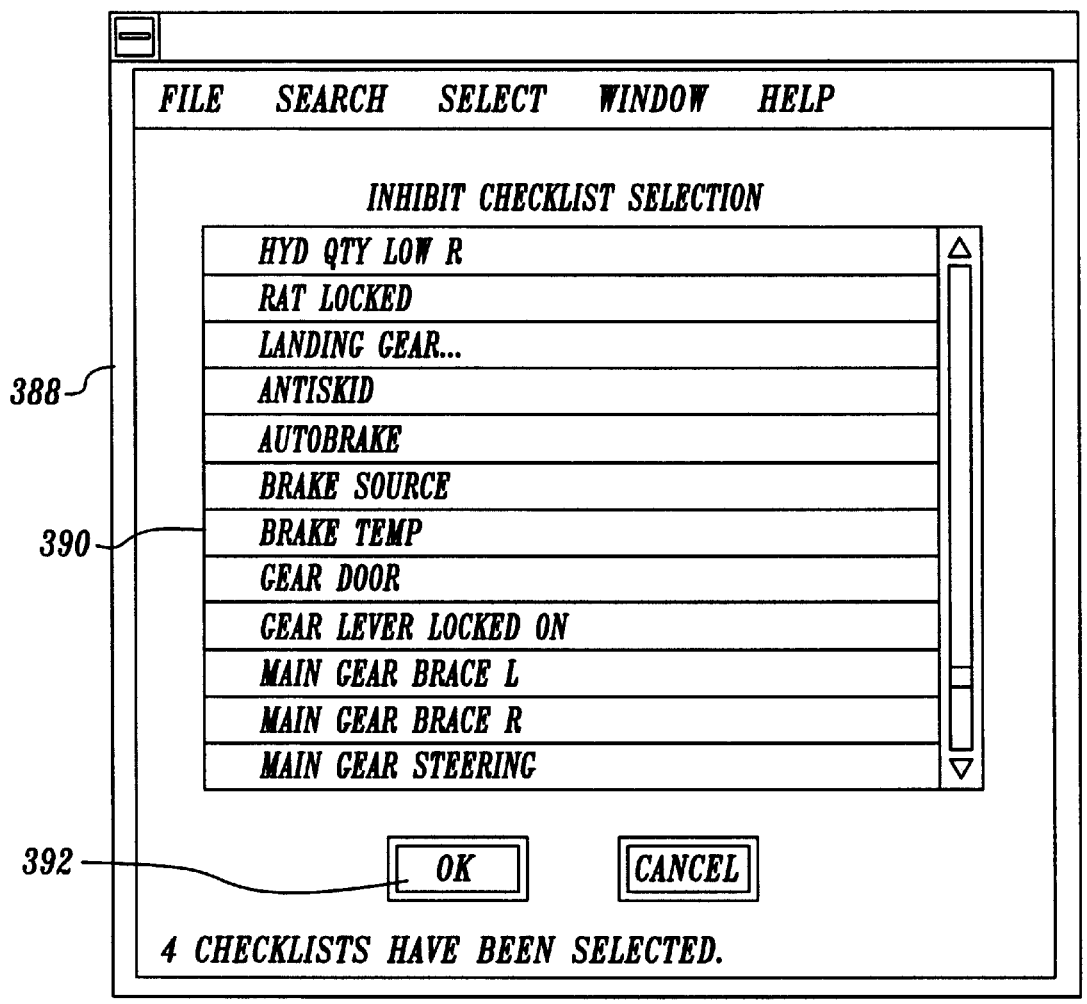

As shown in FIG. 9, a blank line item 398 with a surrounding box 400 is displayed below operational note line item 380 within the ECL checklist display area 352. Also, an inhibit checklist window 416 is displayed in working area 354. The inhibit checklist window 416 includes a text window 404, a selected inhibit checklist list 406, and a deferred checklist box 408. The text window 404 includes title text that will be displayed on the top line of the line item that will be generated. The title text in text window 404 may be edited by the user. In the deferred checklist box 408, the normal checklist that the item will be deferred to is identified by the user. The inhibit checklist list 406 displays all the checklists that were selected by the user in window 388 (FIG. 10).

Window 388 (FIG. 10) is displayed when EDIT button 418 is selected. As shown in FIG. 10, window 388 includes a scrollable display area 390 that lists all non-normal checklists. In the displayed example the non-normal checklists are listed according to their associated aircraft system; for example, the GEAR DOOR checklist is listed under LANDING GEAR. The user identifies the checklists that are to be inhibited by the GEAR DISAGREE checklist by selecting one or more non-normal checklists from the scrollable display area 390. When the user is done selecting checklists to be inhibited, the user selects an OK button 392 within window 388 which presents window 406 shown in the screen shot of FIG. 9.

Figure 11:
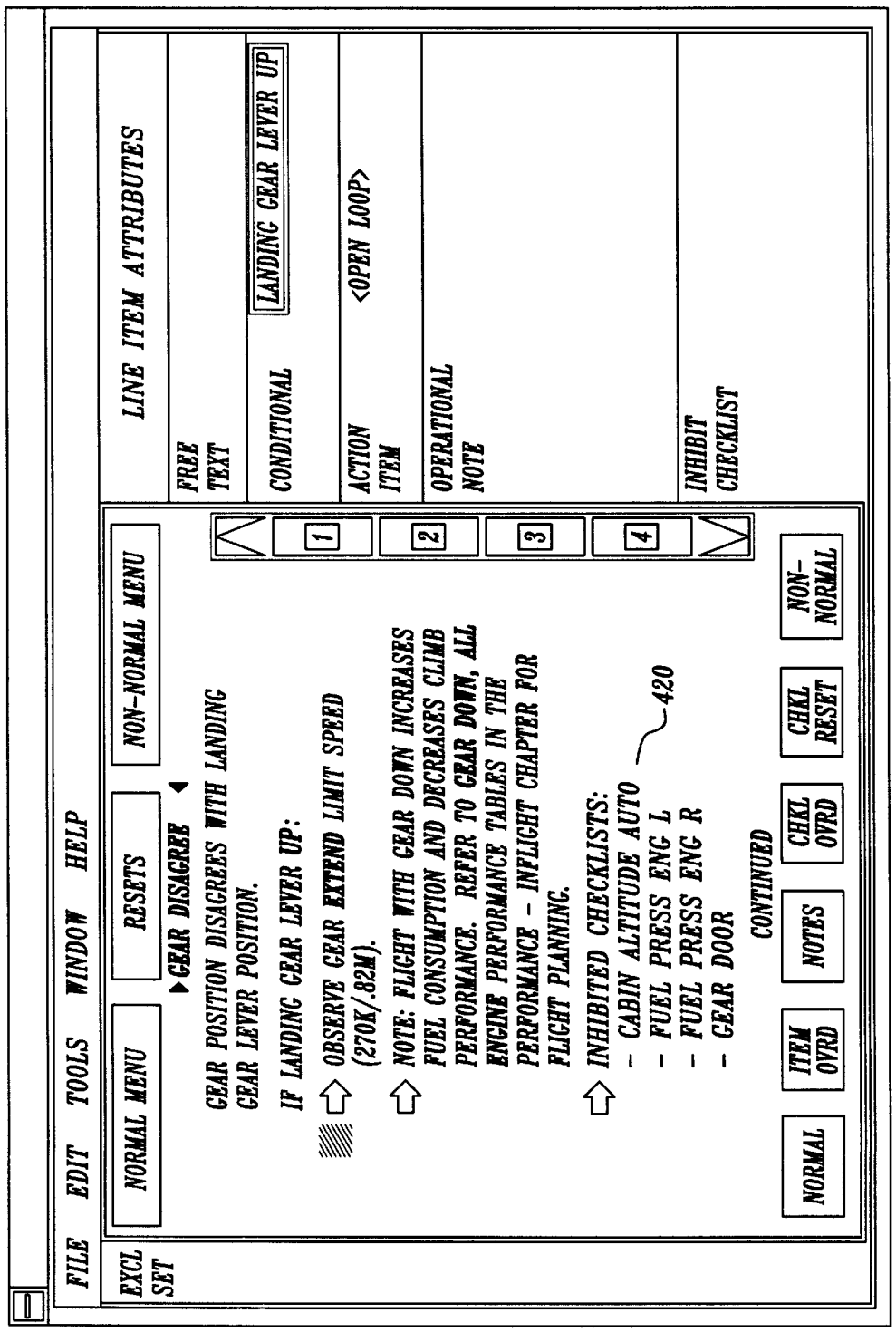

When the user wishes to see how the information entered in window 404 and list 406 will appear in the displayed checklist 352, without performing any saving action, the user selects an Apply button 412 (FIG. 9), which causes the graphical user interface to display an inhibit checklist line item 398 in the displayed checklist 352. After the user determines that the inhibit checklist line item is correct in content and appearance, the user selects an OK button 414 which saves the inhibit checklist line item 420, as shown in FIG. 11, in the displayed checklist 352. After the user has completed any edits or entries using the graphical user interface, the edits or entries are saved onto a removable storage device. Then, the removable storage device is loaded into the aircraft's on-board data loader 126 (FIG. 2). The edits or entries saved on the removable storage device are downloaded into the checklist system data 118, thereby updating the checklist data stored in the checklist system data 118.

In summary, the present invention eliminates unnecessary pilot navigation between checklists associated with primary and the secondary non-normal operating conditions. The result is the elimination of pilot confusion, reducing pilot errors and workload, and improving the ECL system performance. Also, the invention reduces crew training time in simulators.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for displaying non-normal checklists which are provided for display by an electronic checklist system of an operational system in response to determined non-normal operating conditions of the operational system, said method comprising:

determining if prestored non-normal checklists exist for any determined non-normal operational condition; and if two or more non-normal checklists exist, managing access to the existing non-normal checklists based on predefined non-normal checklist status rules.

2. The method of claim 1, wherein managing access comprises:

determining the status of the two or more existing non-normal checklists based on the predefined non-normal checklist status rules, wherein the determined status is inhibited or uninhibited.

3. The method of claim 2, wherein managing access further comprises:

displaying a checklist icon if the determined status of the existing non-normal checklist is uninhibited.

4. The method of claim 2, wherein managing access further comprises:

if the determined status of the existing non-normal checklist is uninhibited, saving any operational notes of the existing uninhibited non-normal checklist to a notes file, saving the existing uninhibited non-normal checklist in a checklist queue, and saving any deferred items of the existing uninhibited non-normal checklist to one or more predefined normal checklists.

5. The method of claim 4, wherein managing access further comprises:

displaying the non-normal checklists saved in the checklist queue; and displaying a non-normal checklist based on a selection from the displayed checklist queue.

6. The method of claim 1, wherein the predefined non-normal checklist status rules comprise:

a first non-normal checklist is uninhibited if no other existing checklist includes an active inhibit attribute for the first non-normal checklist.

7. The method of claim 6, wherein an inhibit attribute is active if the non-normal checklist that contains the inhibit attribute is uninhibited and if the inhibit attribute is contained within a conditional line item within the uninhibited non-normal checklist, the conditional line item is determined true.

8. The method of claim 7, wherein managing access further comprises:

inhibiting an uninhibited non-normal checklist, if another non-normal checklist that includes an inhibit attribute associated with the uninhibited non-normal checklist becomes active after the uninhibited non-normal checklist was determined to exist, wherein inhibiting an uninhibited non-normal checklist comprises:

removing any operational notes of the uninhibited non-normal checklist from a notes file;

removing the uninhibited non-normal checklist from a checklist queue;

removing the checklist status icon from the checklist's associated crew alert message;

removing any deferred items of the uninhibited non-normal checklist from one or more predefined normal checklists; and preserving the current state of the uninhibited non-normal checklist.

9. The method of claim 1, wherein if two or more of the existing non-normal checklists are a set of referring checklists, the first determined existing referring checklist in the set is uninhibited and the one or more other referring checklist in the set is inhibited.

10. The method of claim 1, further comprising:

modifying checklists remotely from the system; and updating the checklists according to the modified checklists.

11. The method of claim 10, wherein modifying comprises:

modifying within a non-normal checklist the other non-normal checklists that are associated with inhibit attributes; and identifying the inhibit attributes' location within a non-normal checklist.

12. An electronic checklist system for displaying non-normal checklists of an operational system in response to determined non-normal operating conditions of the operational system, said system comprising:

a checklist determining component for determining if prestored non-normal checklists exist for any determined non-normal operational condition; and a checklist manager for managing access to the existing non-normal checklists based on predefined non-normal checklist status rules, if two or more non-normal checklists exist.

13. The system of claim 12, wherein the checklist manager comprises:

a status determining component for determining the status of the two or more existing non-normal checklists based on the predefined non-normal checklist status rules, wherein the determined status is inhibited or uninhibited.

14. The system of claim 12, wherein the checklist manager further comprises:
- an icon display component for displaying a checklist icon if the determined status of the existing non-normal checklist is uninhibited.

15. The system of claim 13, wherein the checklist manager further comprises:
- if the determined status of the existing non-normal checklist is uninhibited, a first saving component for saving any operational notes of the existing uninhibited non-normal checklist to a notes file,
- a second saving component for saving the existing uninhibited non-normal checklist in a checklist queue, and
- a third saving component for saving any deferred items of the existing uninhibited non-normal checklist to one or more predefined normal checklists.

16. The system of claim 15, wherein the checklist manager further comprises:
- a checklist queue display component for displaying the non-normal checklists saved in the checklist queue; and
- a checklist display component for displaying a non-normal checklist based on a selection from the displayed checklist queue.

17. The system of claim 12, wherein the predefined non-normal checklist status rules comprise:
- a first non-normal checklist is uninhibited if no other existing checklist includes an active inhibit attribute for the first non-normal checklist.

18. The system of claim 17, wherein an inhibit attribute is active if the non-normal checklist that contains the inhibit attribute is uninhibited and if the inhibit attribute is contained within a conditional line item within the uninhibited non-normal checklist, the conditional line item is determined true.

19. The system of claim 18, wherein the checklist manager further comprises:
- an inhibiting component for inhibiting an uninhibited non-normal checklist, if another non-normal checklist that includes an inhibit attribute associated with the uninhibited non-normal checklist becomes active after the uninhibited non-normal checklist was determined to exist, wherein the inhibiting component comprises:
  - a first removing component for removing any operational notes of the uninhibited non-normal checklist from a notes file;
  - a second removing component for removing the uninhibited non-normal checklist from a checklist queue;
  - a third removing component for removing the checklist status icon from the checklist's associated crew alert message;
  - a fourth removing component for removing any deferred items of the uninhibited non-normal checklist from one or more predefined normal checklists; and
  - a fifth capturing component for capturing the current state of the uninhibited non-normal checklist.

20. The system of claim 12, wherein if two or more of the existing non-normal checklists are a set of referring checklists, the first determined existing referring checklist in the set is uninhibited and the one or more other referring checklist in the set is inhibited.

21. The system of claim 12, further comprising:
- a checklist editor for modifying checklists remotely from the system; and
- a checklist updating component for updating the checklists according to the modified checklists.

22. The system of claim 21, wherein the checklist editor comprises:
- a inhibit attribute modifying component for modifying within a non-normal checklist the other non-normal checklists that are associated with inhibit attributes, and for identifying the inhibit attributes' location within a non-normal checklist.

* * * * *

UNITED STATES PATENT AND TRADEMARK OFFICE
CERTIFICATE OF CORRECTION

PATENT NO.    : 6,262,720 B1
DATED         : July 17, 2001
INVENTOR(S)   : G.S. Jeffrey et al.

It is certified that error appears in the above-identified patent and that said Letters Patent is hereby corrected as shown below:

Title page,
Item [57], ABSTRACT, "checklists does" should read -- checklist does --

Column 18,
Line 3, "a inhibit" should read -- an inhibit --

Signed and Sealed this

Ninth Day of April, 2002

Attest:

Attesting Officer

JAMES E. ROGAN
Director of the United States Patent and Trademark Office